United States Patent
Han et al.

(10) Patent No.: US 11,314,291 B2
(45) Date of Patent: Apr. 26, 2022

(54) DISPLAY DEVICE

(71) Applicant: LG ELECTRONICS INC., Seoul (KR)

(72) Inventors: Dongkyoon Han, Seoul (KR); Jaecheol Kim, Seoul (KR); Chanwoo Kim, Seoul (KR); Jihoon Yoon, Seoul (KR); Jaegi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/734,467

(22) PCT Filed: Nov. 2, 2018

(86) PCT No.: PCT/KR2018/013237
§ 371 (c)(1),
(2) Date: Dec. 2, 2020

(87) PCT Pub. No.: WO2020/071583
PCT Pub. Date: Apr. 9, 2020

(65) Prior Publication Data
US 2021/0216113 A1    Jul. 15, 2021

(30) Foreign Application Priority Data
Oct. 5, 2018  (KR) .................. 10-2018-0118896

(51) Int. Cl.
*G06F 1/18*     (2006.01)
(52) U.S. Cl.
CPC ............. *G06F 1/181* (2013.01); *G06F 1/189* (2013.01)

(58) Field of Classification Search
CPC .... G06F 1/181; G06F 1/189; G02F 1/133325; G02F 1/133314; F16M 11/04
See application file for complete search history.

(56) References Cited

U.S. PATENT DOCUMENTS 9,847,805 B2 * 12/2017 Sirichai ................ H05K 5/0221
10,051,933 B2 * 8/2018 Rogers ................. A45C 13/005
(Continued)

FOREIGN PATENT DOCUMENTS

| KR | 10-20110038552 | 4/2011 |
| KR | 10-2018-0011446 | 2/2018 |

OTHER PUBLICATIONS

PCT International Application No. PCT/KR2018/013237, International Search Report dated Jul. 4, 2019, 4 pages.
(Continued)

*Primary Examiner* — Rockshana D Chowdhury
(74) *Attorney, Agent, or Firm* — Lee Hong Degerman Kang & Waimey

(57) ABSTRACT

A display device according to an embodiment of the present invention may comprise: a display panel; a module cover covering the display panel from behind the display panel; a glass cover comprising a cover portion positioned at the rear of the module cover and a decoration portion positioned below the cover portion and not overlapping the module cover in the forward and backward direction; an electronic mounting plate disposed on the rear surface of the cover portion; a back cover covering the electronic mounting plate from behind the electronic mounting plate; and a stand fixed to the back cover and positioned behind the glass cover.

16 Claims, 11 Drawing Sheets

(56) References Cited

U.S. PATENT DOCUMENTS

| | | | |
|---|---|---|---|
| 10,067,541 B2* | 9/2018 | Lee .......................... | H05K 7/14 |
| 10,649,499 B1* | 5/2020 | Huang .................. | G06F 1/1669 |
| 10,664,026 B2* | 5/2020 | Wang ..................... | G06F 1/203 |
| 10,763,819 B2* | 9/2020 | Kobayashi .............. | H01L 41/09 |
| 2013/0100357 A1 | 4/2013 | Yokawa et al. | |
| 2014/0085783 A1* | 3/2014 | Li .......................... | F16M 11/10 |
| | | | 361/679.01 |
| 2019/0383438 A1* | 12/2019 | Li .......................... | F16M 11/18 |

OTHER PUBLICATIONS

Cart Town, LG Electronics OLED65E8PUA / OLED65E8KNA 65-inch 4K HDR AI ThinQ Smart OLED TV (2018 New Model) [Online], FlyGood, Aug. 30, 2018 [retrieved on May 9, 2019], Retrieved from <URL: http://flyGood.co.kr/tem.php?it_id=1526457016>.

Kim, Moon Ki [M's review] After Using LG Cineview Monitor '34UM65' [Online] Jul. 15, 2014, [Retrieved on May 9, 2019], Retrieved from <URL: http://www.kinews.net/news/articleView.htmp?idxno=M9634>.

* cited by examiner

[FIG. 1]
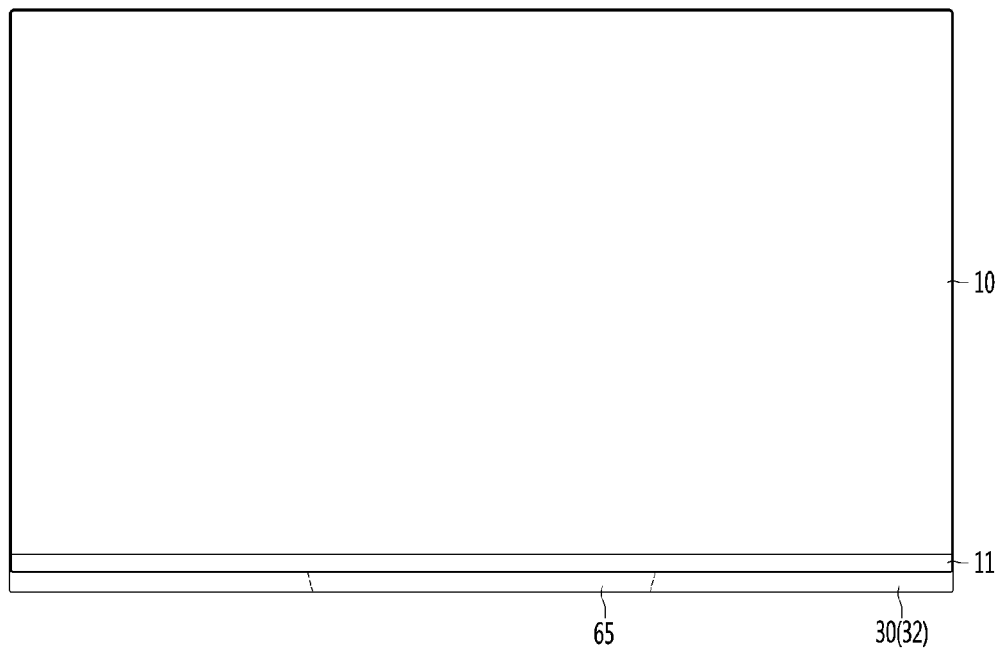

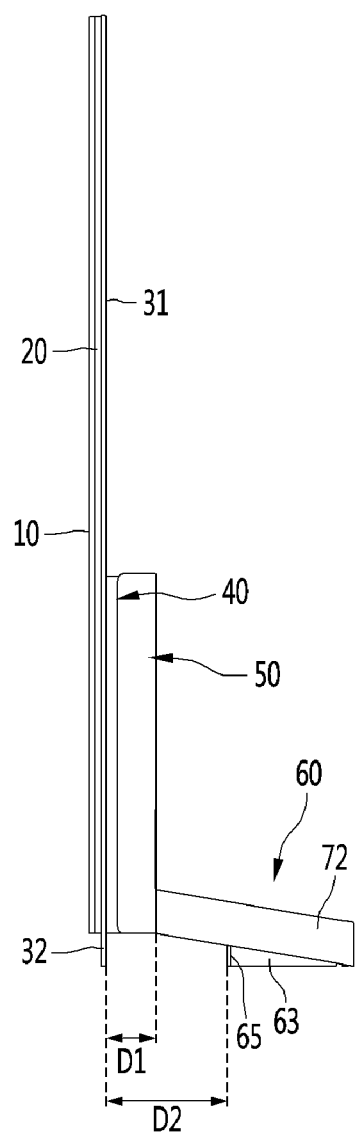
[FIG. 2]

[FIG. 3]
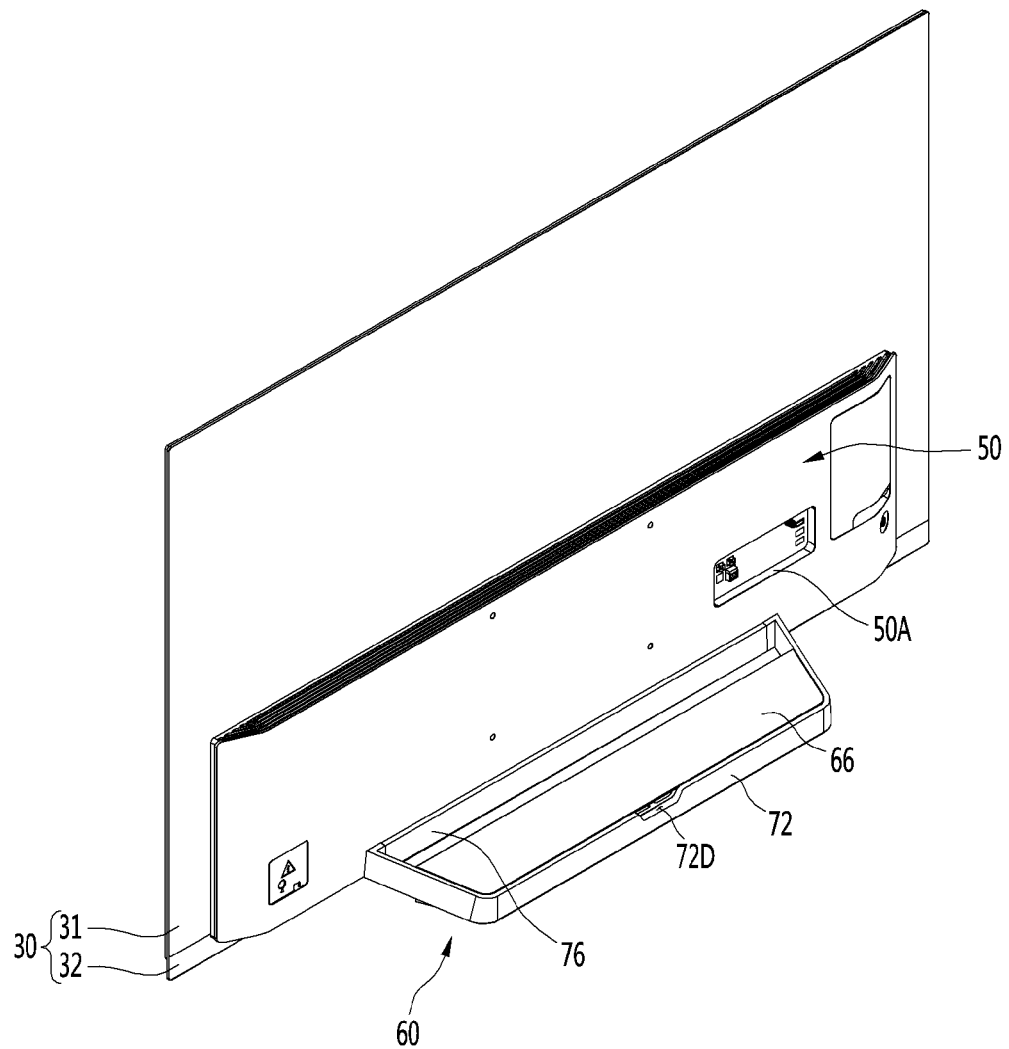

[FIG. 4]
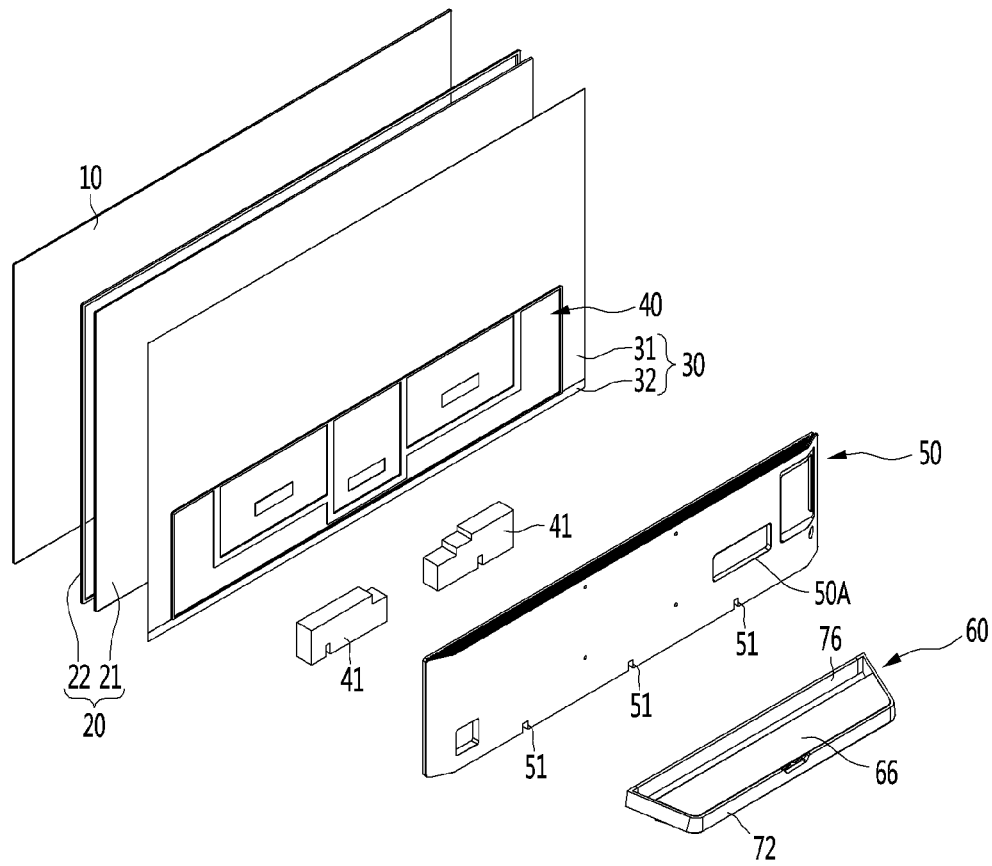

[FIG. 5]
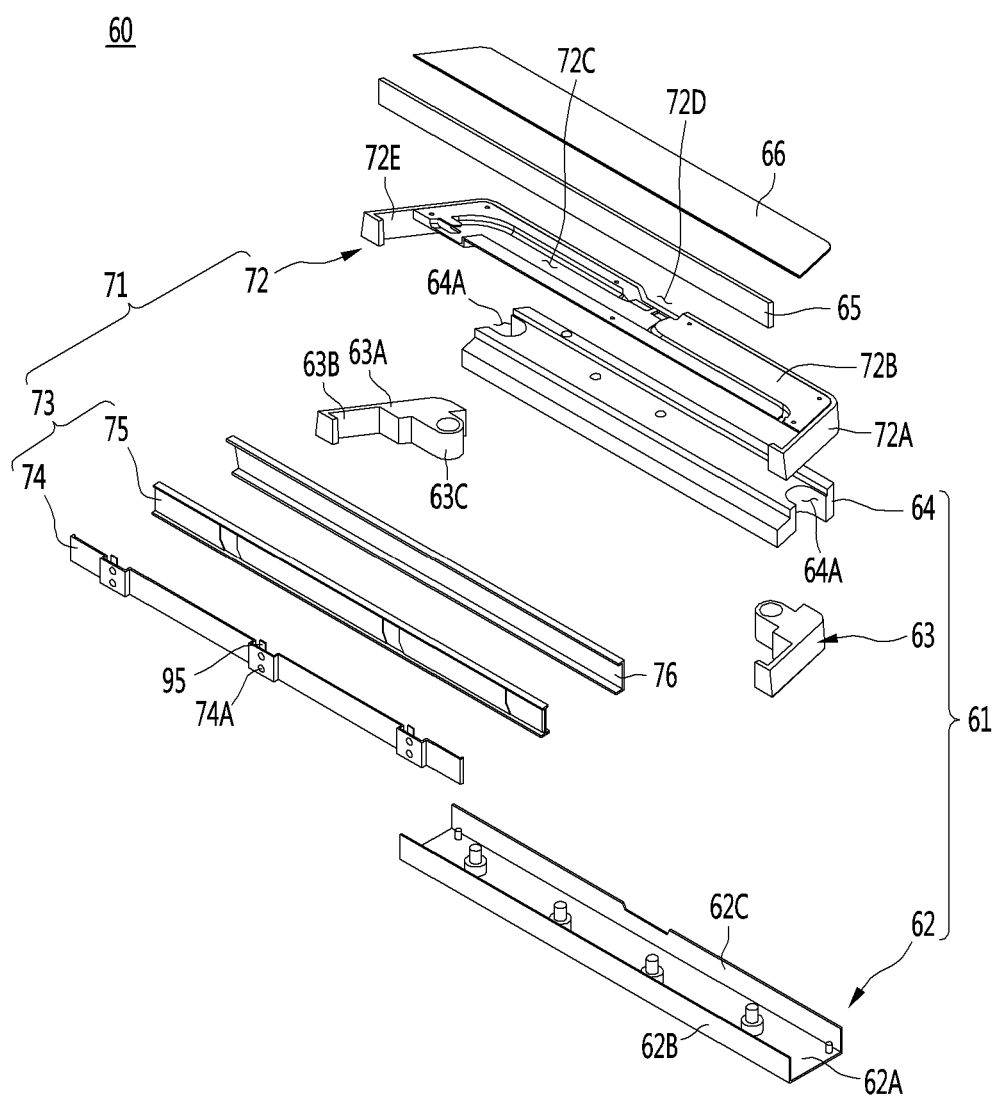

[FIG. 6]
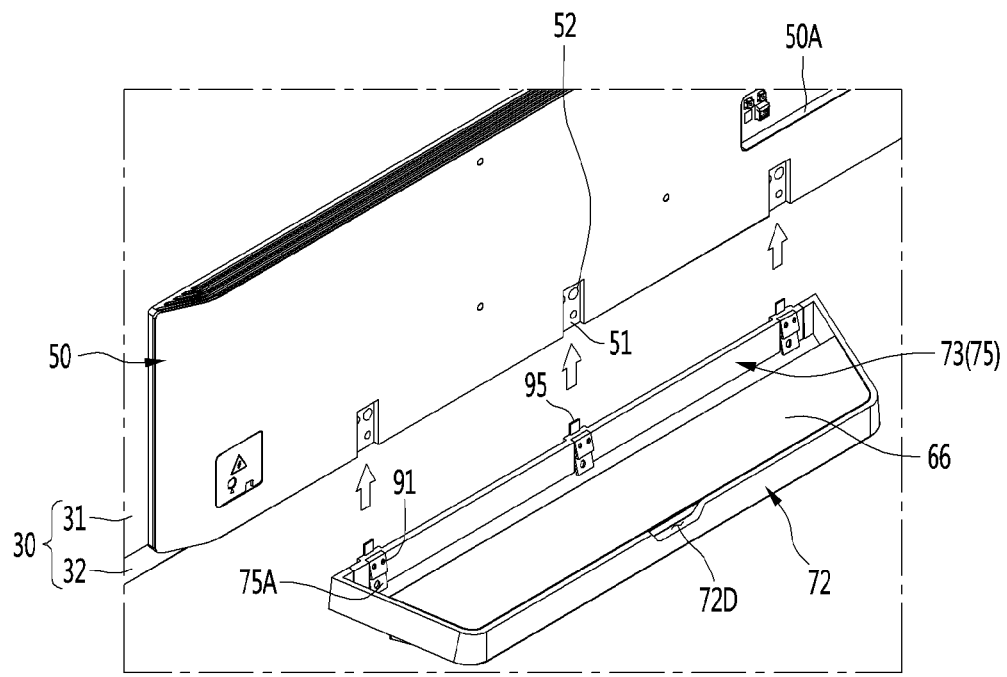

[FIG. 7]
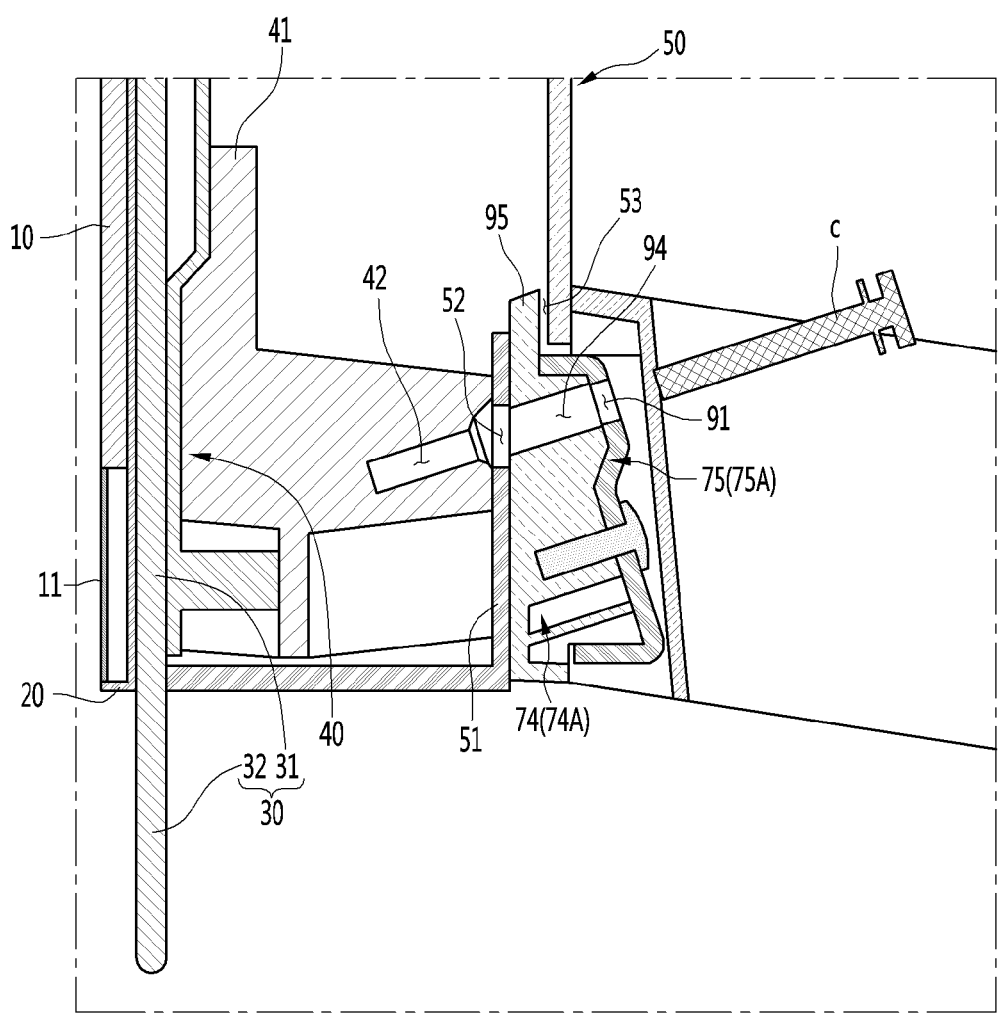

[FIG. 8]
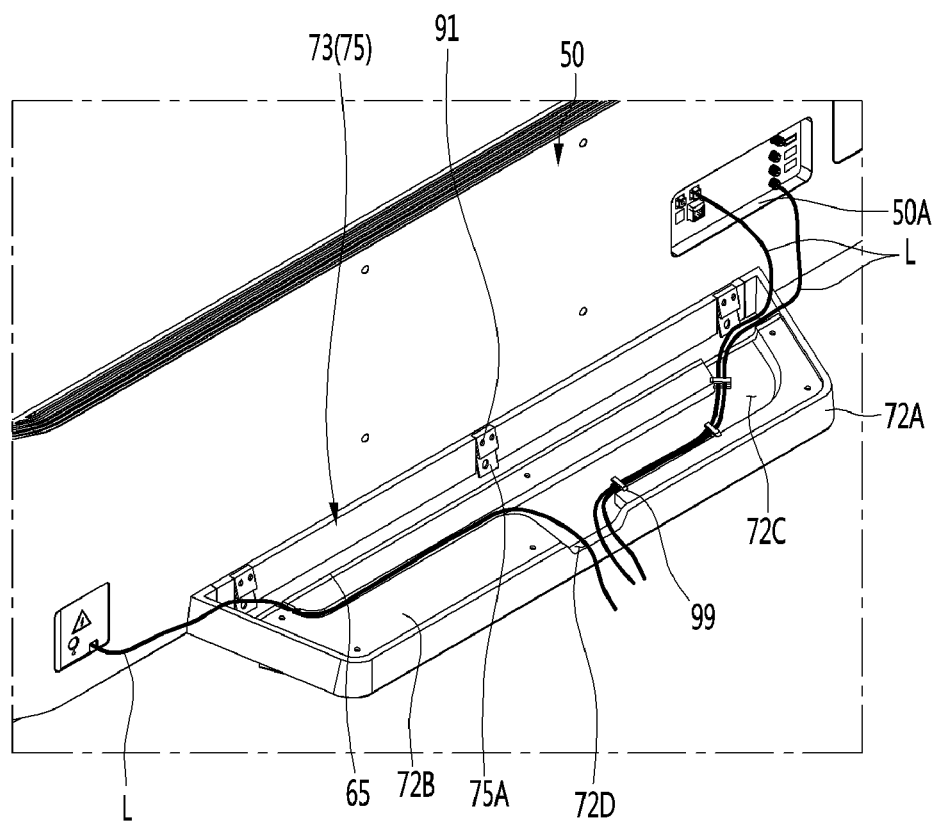

[FIG. 9]
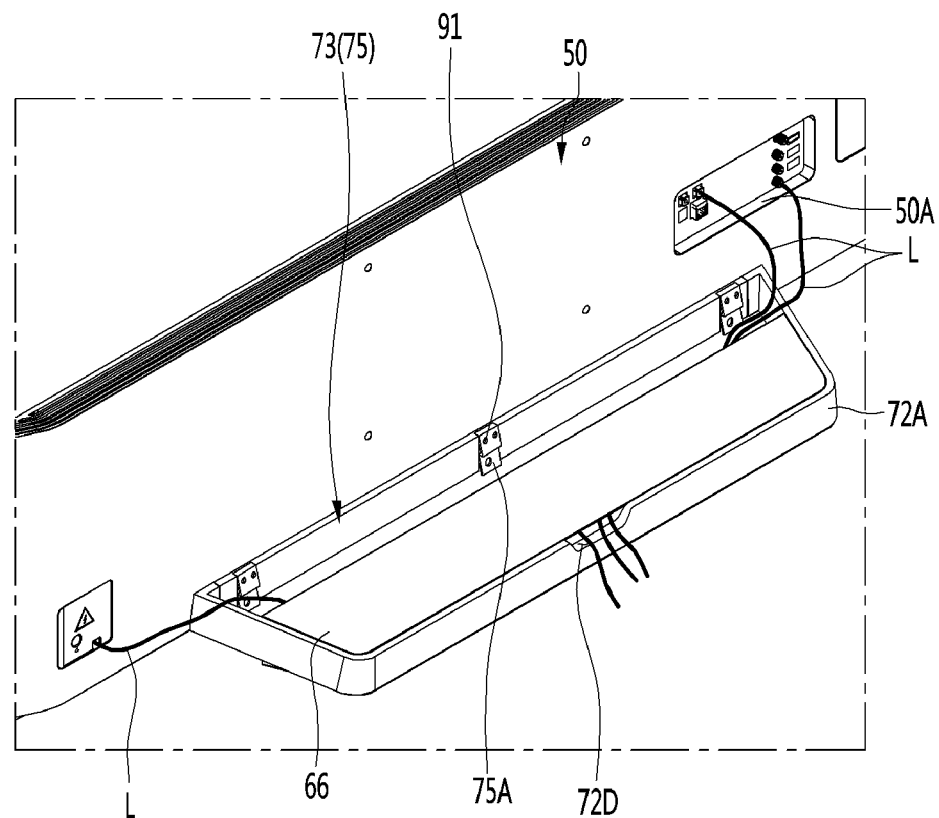

[FIG. 10]
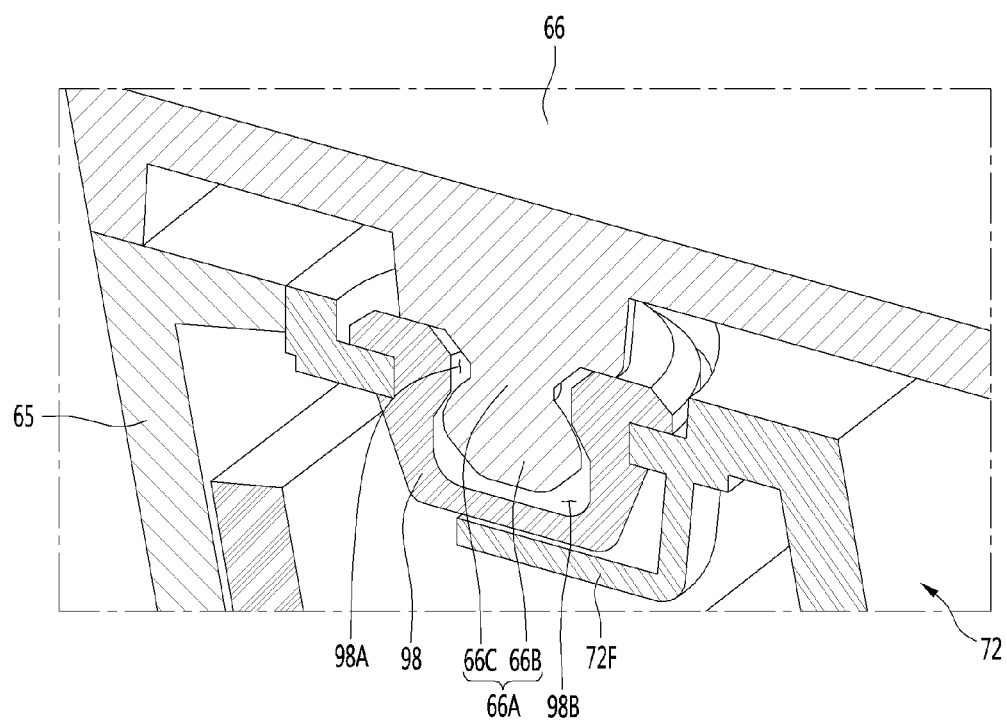

【FIG. 11】
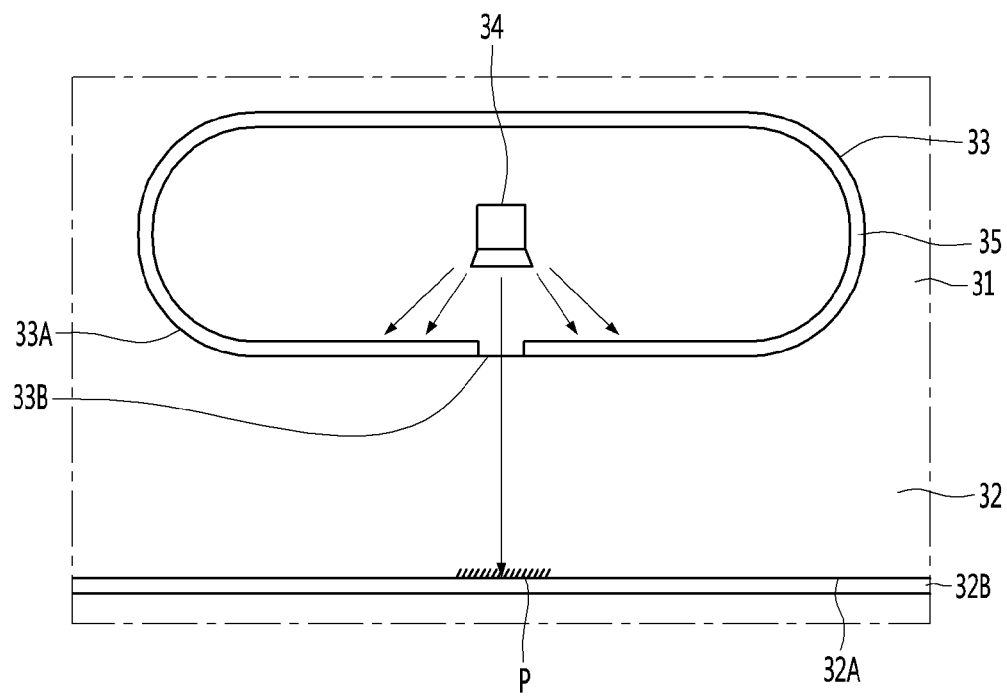

DISPLAY DEVICE

CROSS-REFERENCE TO RELATED APPLICATIONS

This application is the National Stage filing under 35 U.S.C. 371 of International Application No. PCT/KR2018/013237, filed on Nov. 2, 2018, which claims the benefit of earlier filing date and right of priority to Korean Application No. 10-2018-0118896, filed on Oct. 5, 2018, the contents of which are all hereby incorporated by reference herein their entirety.

TECHNICAL FIELD

The present disclosure relates to a display device, and more particularly, to a display device supported by a stand.

BACKGROUND ART

Display devices include a liquid crystal display (LCD), a field emission display (FED), a plasma display panel (PDP), an electroluminescence device, and the like.

As an example of the electroluminescence device, an active matrix-type organic light emitting display device using an organic light emitting diode (OLED) is commercially available. Since the organic light emitting display device is a self-luminous device, it has no backlight compared to the LCD and has advantages in response speed and viewing angle, thus attracting attention as a next-generation display.

The display device may be classified into a stand-type display device installed on a floor surface by a stand and a wall-mounted display device installed on a wall without including a stand.

In particular, in case of the stand-type display device, an external design of the display device may definitely vary depending on a shape or a fastening method of the stand.

DISCLOSURE

Technical Problem

An aspect of the present disclosure is directed to a display device having a design that gives a feeling as if a display panel floats in the air.

An aspect of the present disclosure is directed to a display device stably supported by a stand, while the stand does not protrude to a front of a display panel.

Technical Solution

To achieve these and other advantages and in accordance with the purpose of the invention, as embodied and broadly described herein, there is provided a display device including: a display panel; a module cover configured to cover the display panel from a rear side; a glass cover including a cover part located at a rear of the module cover and a deco part disposed under the cover part and configured not to overlap the display panel and the module cover in a front-rear direction; an electric component plate provided at a rear surface of the cover part; a back cover configured to cover the electric component plate from a rear side; and a stand fixed to the back cover and located at a rear of the glass cover.

A non-slip part may be provided at a lower end of the deco part.

The stand may include a base spaced apart from the deco part; and a fastening assembly connected to the base and fixed to the back cover.

The base may overlap the deco part in the front-rear direction.

The stand may further include a front panel disposed at a front of the base, facing the deco part, and spaced apart from the deco part in the front-rear direction.

A non-slip part may be provided at a lower end of the front panel.

A reflective layer or a glossy layer may be provided at a front surface of the front panel.

A front-rear distance between a rear surface of the deco part and the front surface of the front panel may be longer than a front-rear distance between the rear surface of the cover part and a rear surface of the back cover.

The fastening assembly may include a main body connected to the base; and a fixing bar fixed to the back cover and connected to a front end of the main body, and the front panel may be located at a rear of the fixing bar.

A cable guide part in which a cable is disposed may be provided at the main body.

The stand may further include a top cover configured to cover the cable guide part from an upper side.

An insertion part inserted into a fixing part recessed on the rear surface of the back cover may be provided at the fixing bar.

An engaging portion inserted into and fixed to a fixing recess provided at a lower portion of the back cover may be provided at the fixing bar.

A fastening hole through which a fastening member passes may be provided at the fixing bar, and the fastening hole may be formed obliquely with respect to a horizontal direction.

The electric component plate may have a stand fastening part to which a fastening member passing through the fastening hole is fastened.

The stand may further include a deco cover covering the fixing bar from a rear side.

The fixing bar and the deco cover may be coupled by magnetic force.

The cover part may have a long hole in which a light source facing downward is disposed, and an inner circumference of the long hole may include a light blocking area in which a black layer is formed; and a light passing region located under the light source.

Advantageous Effects

According to a preferred embodiment of the present disclosure, the glass panel includes the deco part that does not overlap the display panel and the module cover in a front-rear direction, thereby implementing a design providing a feeling as if the display panel floats in the air by the transparent deco part.

In addition, since the stand is located behind the glass cover, the stand does not protrude toward a front of the display panel, so that exposure of the stand to the front may be minimized.

In addition, since the non-slip part is provided at a lower end of the deco part, the display device may not slide even if the display device is installed on an inclined surface.

In addition, the deco part of the glass cover may overlap the base. That is, the deco part may be formed to reach the floor surface or may be formed down to a lower side to be adjacent thereto. As a result, the feeling as if the display panel floats in the air may be further improved.

In addition, since the reflective layer or the glossy layer is formed on the front surface of the front panel of the stand and the front panel is spaced apart from the deco part, it is possible to minimize recognition of the front panel through the transparent deco part.

In addition, since the non-slip part is formed at the lower end of the front panel, the stand may not slide even if the display device is installed on an inclined surface.

In addition, since the cable guide part is formed on the stand, the cable connected to an electric component may be prevented from being exposed to the front through the transparent deco part.

In addition, since the top cover covers the cable guide part, an aesthetic appearance of the stand may be improved.

In addition, since the insertion part inserted into the fixing part recessed on the rear surface of the back cover is formed on the fixing bar, the stand may be fixed to the back cover in a left-right direction.

In addition, since the fixing bar is provided with the engaging portion fitted and fixed to the fixing recess formed at a lower portion of the back cover, the stand may be fixed to the back cover in the front-rear direction.

In addition, since the fastening member is fastened to the stand fasting part in the back cover through the fastening hole formed at the fixing bar and the through hole formed at the back cover, the stand may be firmly fastened to the back cover and the stand fastening part.

In addition, since the fastening member is fastened obliquely, the stand fastening part may be formed to be small and disposed at a low position in the back cover. Accordingly, a limitation of a position of the stand fastening part in the back cover may be minimized, so that space utilization in the back cover may be increased and the back cover may be formed to be compact.

In addition, since the decorative cover covers the fixing bar, an aesthetic appearance of the stand may be improved.

In addition, since the deco cover is coupled with the fixing bar by magnetic force, the deco cover may be easily detached.

In addition, since the light source facing downward is disposed at the cover part of the glass cover, an image may be formed at a lower end of the deco part, so that the user may recognize it. Here, since the stand is located at the rear of the glass cover, the stand does not cover the image.

In addition, since the inner circumference of the long hole in which the light source is disposed includes the light blocking region in which the black layer is formed, it is possible to prevent light from leaking in a direction other than the lower end of the deco part.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 is a front view of a display device according to an embodiment of the present disclosure.

FIG. 2 is a side view of a display device according to an embodiment of the present disclosure.

FIG. 3 is a rear perspective view of a display device according to an embodiment of the present disclosure.

FIG. 4 is an exploded perspective view of a display device according to an embodiment of the present disclosure.

FIG. 5 is an exploded perspective view of a stand according to an embodiment of the present disclosure.

FIG. 6 is a view illustrating a process of fixing a stand to a back cover.

FIG. 7 is a view illustrating fastening of a stand by a fastening member.

FIG. 8 is a view showing a state where a top cover and a deco cover are removed from a stand fixed to a back cover.

FIG. 9 is a view illustrating a state where a cover is mounted on the stand shown in FIG. 8.

FIG. 10 is a view illustrating a method of mounting a top cover.

FIG. 11 is an enlarged view of a portion of a lower side of a glass cover.

MODE FOR INVENTION

Hereinafter, specific embodiments of the present disclosure will be described in detail together with the drawings.

FIG. 1 is a front view of a display device according to an embodiment of the present disclosure, FIG. 2 is a side view of a display device according to an embodiment of the present disclosure, and FIG. 3 is a rear perspective view of a display device according to an embodiment of the present disclosure, and FIG. 4 is an exploded perspective view of a display device according to an embodiment of the present disclosure.

The display device according to an embodiment of the present disclosure may include a display panel 10, a module cover 20, a glass cover 30, an electric component plate 40, a back cover 50, and a stand 60.

The display panel 10 may output an image. The display panel 10 is preferably an OLED panel, but is not limited thereto.

The display panel 10 may have a substantially rectangular panel shape. A horizontal length of the display panel 10 may be longer than a vertical length thereof. However, the present disclosure is not limited thereto, and the horizontal length and the vertical length of the display panel 10 may be the same.

The module cover 20 may cover the display panel 10 from the rear.

The module cover 20 may dissipate heat generated by the display panel 10 and may perform electromagnetic interference (EMI) shielding. In addition, the module cover 20 may prevent light from leaking to the rear and side of the display panel 10.

The module cover 20 may include an inner plate 21 and a middle frame 22.

The inner plate 21 is located behind the display panel 10 and may cover a rear surface of the display panel 10.

The middle frame 22 may surround an outer circumference of the display panel 10 and the inner plate 21.

The middle frame 22 and the inner plate 21 may be integrally formed or may be formed as separate members. In addition, the module cover 20 may not include the middle frame 22 and a separate sealing member may cover an outer circumference of the display panel 10 and the inner plate 21.

The glass cover 30 may be disposed behind the module cover 20.

The glass cover 30 may include a glass material. Preferably, the glass cover 30 may include a tempered glass material. The glass cover 30 may be formed entirely of glass.

A height of the glass cover 30 may be higher than each of the display panel 10 and the module cover 20.

In detail, the glass cover 30 may include a cover part 31 located at a rear of the module cover 20 and a deco part 32 located at a lower side of the cover part 31.

The cover part 31 may overlap the display panel 10 and the module cover 20 in a front-rear direction. The deco part 32 may not overlap the display panel 10 and the module cover 20 in a front-rear direction.

Accordingly, when the user views the display device from the front, the cover part 31 may be covered by the display panel 10 and the module cover 20 and may not be visible. Meanwhile, the deco part 32 is not covered by the display panel 10 and the module cover 20 and thus may be seen by the user.

Since the deco part 32 is entirely formed of transparent glass, the deco part 32 may provide a high-end feeling to the user, thereby improving aesthetics of the display device.

The deco part 32 may be in contact with a floor surface on which the display device is installed or may be spaced apart from the floor surface.

The electric component plate 40 may be provided on a rear surface of the cover part 31. The electric component plate 40 may be connected to the cover part 31 or may be connected to the module cover 20 through the cover part 31.

An electric component such as a system board (SB) and a power supply (PS) may be installed on the electric component plate 40.

In addition, the electric component plate 40 may be provided with a stand fastening part 41 to which a fixing bar 73 (refer to FIG. 5) of the stand 60 to be described later is fastened.

The stand fastening part 41 may be fastened to the electric component plate 40 or formed integrally with the electric component plate 40.

The back cover 50 may cover the electric component plate 40 and electric components mounted on the electric component plate 40 from the rear. In addition, the back cover 50 may cover the stand fastening part 41 from the rear. That is, the stand fastening part 41 may be located inside the back cover 50.

A size of the back cover 50 may be formed to be similar to that of the electric component plate 40, but is not limited thereto. The size of the back cover 50 may be formed smaller than the size of the glass cover 30.

The back cover 50 may overlap the cover part 31 of the glass cover 30 in the front-rear direction and may not overlap the deco part 32. Accordingly, when the user views the display device from the front, the back cover 50 may not be visible behind the transparent deco part 32. As a result, aesthetics of the display device may be improved.

At least one fixing part 51 may be formed on the back cover 50.

The fixing part 51 may be formed recessing by a lower part including a lower end of the back cover 50. An insertion part 74A (see FIG. 5) formed on the fixing bar 73 (see FIG. 5) of the stand 60 may be inserted into the fixing part 51. This allows the stand 60 to be fixed to the back cover 50 with respect to the left-right direction.

A through hole 52 (refer to FIG. 6) may be formed at the fixing part 51. The through hole 52 may be formed through the front-rear direction. A fastening member C (see FIG. 7) passing through fastening holes 91 and 94 (see FIG. 7) formed at the fixing bar 73 (see FIG. 6) may pass through the through hole 52, and the fastening member C may be fastened to the stand fastening part 41. Accordingly, the stand 60 may be fastened to the stand fastening part 41.

A fixing recess 53 (see FIG. 7) may be formed at an upper portion of the fixing part 51. In the fixing recess 53, an engaging portion 95 (see FIG. 5) formed at the fixing bar 73 (see FIG. 5) of the stand 60 may be fitted. This allows the stand 60 to be fixed to the back cover 50 with respect to the front-rear direction.

In addition, an opening portion 50A may be formed at the back cover 50. The opening portion 50A may be formed on a rear surface of the back cover 50. The opening portion 50A may allow a cable L (see FIG. 8) to be connected to an electric component mounted on the electric component plate 40 through a portion of the rear surface of the back cover 50.

The stand 60 may support the display device so that the display device does not fall.

The stand 60 may be fixed to the back cover 50. The stand 60 may be fastened to the stand fastening part 41 by a fastening member C (see FIG. 7) such as a screw.

The stand 60 may be located at a rear of the glass cover 30.

In detail, the entire stand 60 may be located behind the display panel 10, the module cover 20, and the glass cover 30. When the user looks at the display device from the front, only a part of a lower side of the stand 60 may be visible to the user through the transparent deco part 32. Accordingly, it is possible to give the user a feeling as if the display panel 10 floats in the air, and thus aesthetics of the design of the display device may be improved.

FIG. 5 is an exploded perspective view of a stand according to an embodiment of the present disclosure, FIG. 6 is a view illustrating a process of fixing a stand to the back cover, FIG. 7 is a view illustrating fastening of a stand by a fastening member, FIG. 8 is a view showing a state where a top cover and a deco cover are removed from a stand fixed to the back cover, FIG. 9 is a view illustrating a state where the top cover is mounted on the stand shown in FIG. 8, and FIG. 10 Is a view illustrating a method of mounting a top cover.

Hereinafter, a configuration of the stand 60 will be described specifically with reference to FIGS. 2 to 10.

The stand 60 may include a base 61 and a fastening assembly 71.

The base 61 is placed on a floor surface on which the display device is installed, and may support the display device.

The base 61 may be located at a rear of the deco part 32 of the glass cover 30. The base 61 may be spaced apart from the deco part 32 in the front-rear direction. The base 61 may overlap the deco part 32 in the front-rear direction.

The base 61 may include a base body 62, a bridge 63, and a weight 34.

The base body 62 may be placed on the floor surface. The base body 62 may include a frame having a cross section in which a 'C' shape is rotated 90 degrees in a counterclockwise direction. The base body 62 may include a lower plate 62A placed on the floor surface, a front plate 62B extending upward from a front end of the lower plate 62A, and a rear plate 62C extending upward from a rear end of the lower plate 62A.

The base body 62 may be elongated in the left-right direction. The base body 62 may include a metal material.

A pair of bridges 63 may be fastened to left and right ends of the base body 62, respectively. The bridges 63 may support the fastening assembly 71 obliquely with respect to a horizontal direction.

The bridge 63 may include a first body 63A fastened to the base body 61 and a second body 63B connected to the first body 63A and formed to be inclined toward an upper front side. At least a portion of the first body 63A may be inserted and fastened between the front plate 62B and the rear plate 62C of the base body 62. The second body 63B may support the fastening assembly 71 obliquely with respect to the horizontal direction. Since the fastening assembly 71 is disposed obliquely in a direction that increases toward the front, it is possible to minimize viewing of the fastening assembly 71 through the deco part 32 of the glass panel 30 when the user views the display device from the front.

A weight body 64 may have a large mass. As described above, since the entire stand 60 is located behind the display panel 10, the module cover 20, and the glass cover 30, the display device may fall forward. Therefore, in order to solve this problem, the stand 60 may be configured to be sufficiently heavy. That is, the weight of the stand 60 may be increased by the weight body 64 and the display device may be prevented from falling forward.

The weight body 64 may be supported by the base body 62. The weight body 64 may be disposed on an upper side of the lower plate 62A of the base body 62. At least a portion of the weight body 64 may be located between the front plate 62B and the rear plate 62C of the base body 62.

At least one weight body 64 may be provided. As an example, a single weight body 64 may be formed to be elongated horizontally. As another example, a pair of weights 64 may be disposed to be adjacent to or in contact with the pair of bridges 63, respectively.

A depression 64A may be formed in the weight body 64, and a protrusion 63C corresponding to a shape of the depression 64A may be formed at the bridge 63. The protrusion 63C may be formed to protrude from the first body 63A of the bridge 63 toward the weight body 64.

The protrusion 63C of the bridge 63 may be fitted into the depression 64A of the weight body 64. Accordingly, a position of the weight body 64 may be fixed. However, a coupling method of the weight body 64 and the bridge 63 is not limited thereto, and a protrusion is formed at the weight body 64 and a depression portion may be formed at the bridge 63.

The stand 60 may further include a front panel 65 disposed in front of the base 61.

In detail, the front panel 65 may be disposed in front of the front plate 62B of the base body 62. The front panel 65 may be formed to be elongated horizontally.

The front panel 65 may face the deco part 32 of the glass panel 30. The front panel 65 may be spaced apart from the deco part 32 in the front-rear direction.

Accordingly, when the user views the display device at the front, the front panel 65 may be seen behind the transparent deco part 32. However, it may hinder a feeling that the display panel 10 floats in the air, it is preferable that the user does not recognize the front panel 65.

To this end, a reflective layer or a glossy layer may be formed on the front surface of the front panel 65. The reflective layer or the glossy layer may be formed by post-processing the front panel 65. For example, the reflective layer or the glossy layer may be formed by a hot-stamping process.

A non-slip part (not shown) may be formed at a lower end of the front panel 65. The non-slip part may include a material having high frictional force such as rubber or silicone. Accordingly, even if the display device is installed on an inclined floor, it is possible to prevent the display device from slipping.

In addition, the front panel 65 may be disposed to be spaced apart from the rear of the glass cover 30 by a sufficient distance. Specifically, a front-rear distance D2 (see FIG. 2) between the rear surface of the deco part 32 of the glass cover 30 and the front surface of the front panel 65 may be longer than a front-rear distance D1 (see FIG. 2) between the rear surface of the cover part 31 of the glass cover 30 and the rear surface of the back cover 50. Accordingly, it is possible to minimize recognition of the front panel 65 through the deco part 32 of the glass cover 30.

Meanwhile, the fastening assembly 71 may be connected to the base 61 and may be fixed to the back cover 50.

In detail, the fastening assembly 71 may include a main body 72 and a fixing bar 73.

The main body 72 may be connected to the base 61. The main body 72 may be mounted on an upper side of the base 61 and may extend toward the back cover 50.

The main body 72 may include an outer frame 72A and an inner cover 72B.

The outer frame 72A may have a 'C' shape. Specifically, the outer frame 72A may include a rear frame elongated horizontally and a pair of side frames extending forward from left and right ends of the rear frame.

The outer frame 72A may be disposed obliquely with respect to the horizontal direction. Specifically, the outer frame 72A may be supported by the bridge 63 of the base 61 and may be disposed obliquely in a direction increasing toward the front.

A support part 72E may be formed on an inner surface of each side frame of the outer frame 72A, and the support part 72E may be supported in contact with the second body 63B of the bridge 63.

Specifically, the support part 72E may include an upper plate extending inward from an upper end of the side frame and an extending plate extending downward from an inner end of the upper plate. The second body 63B of the bridge 63 may be inserted between the extending plate of the support part 72E and the side frame and may be in contact with the upper plate of the support part 72E.

The inner cover 72B may be provided on the inner surface of the outer frame 72A. The inner cover 72B may be formed to be elongated horizontally.

The inner cover 72B and the outer frame 72A may be integrally formed, but are not limited thereto.

The inner cover 72B may be formed perpendicular to the outer frame 72A. Since the outer frame 72A is disposed obliquely with respect to the horizontal direction, the inner cover 72B may also be obliquely disposed with respect to the horizontal direction.

A front end of the inner cover 72B may be located behind the front end of the outer frame 72A. The inner cover 72B may be located behind the support part 72E.

The inner cover 72B may cover the base 61 from an upper side.

The front panel 65 may be in contact with the inner cover 72B. Specifically, an upper end of the front panel 65 may be in contact with the front end of the inner cover 72B. That is, a part of the upper side of the front panel 65 may be located inside the outer frame 72A.

A cable guide part 72C may be formed at the inner cover 72B, and a cable passage recess 72D communicating with the cable guide part 72C may be formed at the outer frame 72A.

The cable guide part 72C may be formed by recessing a part of the inner cover 72B. At least a part of a cable L (see FIG. 8) may be disposed at the cable guide part 72C. The cable L may be connected to an electric component through the opening portion 50A of the back cover 50.

The cable guide part 72C may have at least one cable restraining member 99 (see FIG. 8) for restraining movement of the cable L.

The cable L connected to the electric component may pass through the cable guide part 72C and may be released through the cable passage recess 72D.

The cable passage recess 72D may be formed at the rear frame of the outer frame 72A. Specifically, the cable passage recess 72D may be formed by depressing an upper end of the rear frame.

The cable guide part 72C and the cable passage recess 72D may be covered by a top cover 66 to be described later.

That is, the cable L may be guided between the inner cover 72B and the top cover 66 and may exit to the rear of the stand 60. Accordingly, when the user looks at the display device from the front, the cable L may not be visible. As a result, aesthetics of the display device may be improved.

The fixing bar 73 may be fixed to the back cover 50. The fixing bar 73 may be formed to be elongated horizontally.

The fixing bar 73 may be connected to a front end of the main body 72. Specifically, the fixing bar 73 may be connected to the front end of the outer frame 72A. Specifically, both ends of the fixing bar 73 may be connected to the front ends of a pair of side frames included in the outer frame 72A, respectively.

The fixing bar 73 may be located at a front of the inner cover 72B and the front panel 65. The fixing bar 73 may be spaced apart from the inner cover 72B and the front panel 65.

The fixing bar 73 may include a first fixing bar 74 and a second fixing bar 75.

The first fixing bar 74 may be fixed to the back cover 50. The second fixing bar 75 may be fastened to the outer frame 72A of the main body 72.

The second fixing bar 75 may be fastened with the first fixing bar 74 at the rear of the first fixing bar 74. Since the second fixing bar 75 is fastened to the first fixing bar 74, rigidity of the fixing bar 73 may be further increased.

A horizontal length of the first fixing bar 74 may be less than or equal to a horizontal length of the second fixing bar 75.

At least one insertion part 74A protruding forward may be formed at the first fixing bar 74. In case where a plurality of insertion parts 74A are provided, the plurality of insertion parts 74A may be formed to be spaced apart from each other.

The insertion part 74A may be inserted into the fixing part 51 recessed in the rear surface of the back cover 50. Accordingly, the insertion part 74A may be constrained to the fixing part 51 with respect to the left-right direction and the stand 60 may be fixed to the back cover 50 with respect to the left-right direction.

An engaging portion 95 may be formed on an upper side of the insertion part 74A. The engaging portion 95 may be formed to protrude upward from the insertion part 74A.

The engaging portion 95 may be fitted into the fixing recess 53 (see FIG. 7) located on the upper side of the fixing part 51. Accordingly, the engaging portion 95 may be constrained to the fixing recess 53 in the front-rear direction and the stand 60 may be fixed to the back cover 50 in the front-rear direction.

The second fixing bar 75 may have a fastening part 75A (see FIG. 6) formed at a position corresponding to the protrusion 74A of the first fixing bar 74.

The fastening part 75A may be formed obliquely with respect to a vertical direction.

Fastening holes 91 and 94 through which the fastening member C (see FIG. 7) passes may be formed at the fixing bar 73.

The fastening holes 91 and 94 may include a first fastening hole 91 formed at the fastening part 75A of the second fixing bar 75 and a second fastening hole 94 formed at the protrusion 74A of the first fixing bar 74. The first fastening hole 91 and the second fastening hole 94 may be formed to correspond to each other. The fastening member C may sequentially pass through the first fastening hole 91 and the second fastening hole 94.

The fastening holes 91 and 94 may communicate with the through hole 52 formed at the fixing part 51 of the back cover 50. The fastening member C passing through the fastening holes 91 and 94 may pass through the through hole 52.

The fastening member C passing through the through hole 52 may be fastened to the stand fastening part 41 described above. Specifically, the fastening member C may be fastened to the fastening recess 42 (see FIG. 7) formed at the stand fastening part 41. That is, the through hole 52 may communicate with the fastening recess 42.

For example, the fastening member C may include a screw, and a female thread corresponding to a male thread of the screw may be formed on an inner circumference of the fastening recess 42.

The fastening holes 91 and 94 and the fastening recess 42 may be formed obliquely with respect to a horizontal direction. Like the fastening holes 91 and 94 and the fastening recess 42, the through hole 52 may be formed obliquely or horizontally. When the through hole 52 is formed horizontally, the through hole 52 may be formed to have a size in which the fastening member C, which is obliquely fastened, is not caught.

Accordingly, the fastening member C may be fastened to the fastening recess 42 by sequentially passing through the fastening holes 91 and 94 and the through holes 52 in an oblique direction.

With the above configuration, even if the stand fastening part 41 is formed small and disposed at a low position in the back cover 50, the stand fastening part 41 and the fixing bar 73 may be easily fastened. Accordingly, restriction of a position of the stand fastening part 41 in the back cover 50 is minimized, thereby increasing space utilization in the back cover 50 and allowing the back cover 50 to be formed compact.

Meanwhile, the stand 60 may further include a deco cover 76 covering the fixing bar 73 from the rear.

The deco cover 76 may cover the second fixing bar 75 from the rear. Therefore, the fastening part 75A formed at the second fixing bar 75, the first fastening hole 91 formed at the fastening part 75A, and the fastening member C fitted in the first fastening hole 91 may be covered by the deco cover 76. Accordingly, the appearance of the stand 60 may be improved in design.

The deco cover 76 may be formed to be elongated horizontally. A horizontal length of the deco cover 76 may be greater than or equal to a horizontal length of the second fixing bar 75.

The fixing bar 73 and the deco cover 76 may be coupled by magnetic force. For example, the fixing bar 73, in particular, the second fixing bar 75, may include a metal material, and the deco cover 76 may have a magnet (not shown). Here, it is preferable that the magnet has a magnetic force that does not affect quality of an image output from the display panel 10.

Accordingly, there is an advantage of simply detachably attaching the deco cover 76 to the fixing bar 73. An operator may tighten or loosen the fastening member C in a state of separating the deco cover 76 from the fixing bar 73, and when the work is completed, the operator may attach the deco cover 76 to the fixing bar 73.

Meanwhile, the stand 60 may further include a top cover 66.

The top cover 66 may cover the cable guide part 72C formed at the inner cover 72B and the cable passage recess 72D formed at the outer frame 72A from an upper side.

The top cover 66 may be formed to be elongated horizontally. The top cover 66 may be spaced apart from the fixing bar 73 and the deco cover 76.

A rear end of the top cover 66 may be matched to or may be adjacent to the rear end of the outer frame 72A, and a front end of the top cover 66 may be matched to or may be adjacent to the front end of the front cover 65.

The top cover 66 may be detachably fastened to the main body 72.

Referring to FIG. 10, a grommet mounting part 72F on which a grommet 98 is mounted may be formed on the main body 72.

The grommet mounting part 72F may be formed at the inner cover 72B. The grommet mounting part 72F may be formed by depressing the inner cover 72B downward.

The grommet 98 mounted on the grommet mounting part 72F may include an elastic material such as rubber. The grommet 98 may have an inlet 98A and an accommodation space 98B which is in communication with the inlet 98A and is wider than the inlet 98A.

A fitting protrusion 66A fitted into the grommet 98 may be formed on a bottom surface of the top cover 66. The fitting protrusion 66A may include a fitting part 66B accommodated in the receiving space 98B of the grommet 98 and a connection part 66C connected to an upper side of the fitting part 66B and located at an entrance of the grommet 98.

Since the grommet 98 is formed of an elastic material such as rubber, when the top cover 66 is pressed toward the main body 72 with a certain level of force or more, the fitting part 66B of the fitting protrusion 66A may widen the entrance 98A of the grommet 98 so as to be drawn into the accommodation space 98B, and when the fitting part 66B is completely accommodated in the receiving space 98B, the inlet 98A may be narrowed again. As a result, the fitting protrusion 66A may be separated from the grommet 98 only when the top cover 66 is pulled out with a certain level of force or more.

Accordingly, there is an advantage that the top cover 66 is easily detached from the main body 72. With the top cover 66 separated from the main body 72, the operator may dispose the cable L so that the cable L passes through the cable guide part 72C and the cable passage recess 72D of the main body 72, and thereafter, the operator may couple the top cover 66 to the main body 72.

FIG. 11 is an enlarged view of a portion of the lower side of the glass cover.

A long hole 33 in which the light source 34 is disposed may be formed AT the cover part 31 of the glass cover 30.

The long hole 33 may be formed to be elongated in the left-right direction. The long hole 33 may be formed to penetrate the cover part 31 in the front-rear direction. The long hole 33 may overlap a grille 11 (see FIG. 1) disposed under the display panel 10 in the front-rear direction. That is, the long hole 33 may be located at the rear of the grille 11.

The light source 34 may be a compact optical device such as an LED or the like. At least a portion of the light source 34 may be located inside the long hole 33. The light source 34 may be disposed to face downward.

A black layer 35 may be formed on a part of an inner circumference of the long hole 33. The black layer 35 may block light emitted from the light source 34.

Specifically, the inner circumference of the long hole 33 may include a light blocking region 33A in which the black layer 35 is formed and a light passing region 33B in which the black layer 35 is not formed. The light passing region 33B may be located under the light source 34.

Light emitted from the light source 34 may pass through only the light passing region 33B, and an image P may be formed at the lower end 32A of the glass cover 30. Specifically, the image P may be formed at the lower end (32A) of the deco part 32.

The light source 34 may be turned on when a specific command is input to the display device or when the light source 34 is controlled to a specific state. For example, when the display device is turned on, the light source 34 may be turned on.

As described above, since the stand 60 is located at the rear of the glass cover 30, the image P formed at the lower end of the deco part 32 may not be covered when the user looks at the display device from the front.

In addition, a non-slip part 32B may be formed at a lower end of the deco part 32. The non-slip part 32B may include a material having high friction, such as rubber or silicone. Accordingly, even if the display device is installed on an inclined floor, the display device may be prevented from slipping.

The description above is merely illustrating the technical spirit of the present invention, and various changes and modifications may be made by those skilled in the art without departing from the essential characteristics of the present invention. Therefore, the embodiments of the present invention described above may be implemented separately or in combination with each other.

Therefore, the embodiments disclosed in the present invention are intended to illustrate rather than limit the scope of the present invention, and the scope of the technical spirit of the present invention is not limited by these embodiments.

The scope of the present invention should be construed by claims below, and all technical spirits within a range equivalent to claims should be construed as being included in the right scope of the present invention.

What is claimed is:

1. A display device comprising:
   a display panel;
   a module cover configured to cover the display panel from a rear side;
   a glass cover including a cover part located at a rear of the module cover and a deco part disposed under the cover part and configured not to overlap the display panel and the module cover in a front-rear direction;
   an electric component plate provided at a rear surface of the cover part;
   a back cover configured to cover the electric component plate from a rear side; and
   a stand fixed to the back cover and located at a rear of the glass cover,
   wherein the stand comprises:
   a base spaced apart from the deco part;
   a fastening assembly connected to the base and fixed to the back cover; and
   a front panel disposed at a front of the base, facing the deco part, and spaced apart from the deco part in the front-rear direction.

2. The display device of claim 1, wherein a non-slip part is provided at a lower end of the deco part.

3. The display device of claim 1, wherein the base overlaps the deco part in the front-rear direction.

4. The display device of claim 1, wherein a non-slip part is provided at a lower end of the front panel.

5. The display device of claim 1, wherein a reflective layer or a glossy layer is provided at a front surface of the front panel.

6. The display device of claim 1, wherein a front-rear distance between a rear surface of the deco part and the front surface of the front panel is longer than a front-rear distance between the rear surface of the cover part and a rear surface of the back cover.

7. The display device of claim 1, wherein the fastening assembly comprises:
 a main body connected to the base; and
 a fixing bar fixed to the back cover and connected to a front end of the main body, and
 wherein the front panel is located at a rear of the fixing bar.

8. The display device of claim 7, wherein a cable guide part in which a cable is disposed is provided at the main body.

9. The display device of claim 8, wherein the stand further comprises a top cover configured to cover the cable guide part from an upper side.

10. The display device of claim 7, wherein an insertion part inserted into a fixing part recessed on the rear surface of the back cover is provided at the fixing bar.

11. The display device of claim 7, wherein an engaging portion inserted into and fixed to a fixing recess provided at a lower portion of the back cover is provided at the fixing bar.

12. The display device of claim 7, wherein a fastening hole through which a fastening member passes is provided at the fixing bar, and
 wherein the fastening hole is formed obliquely with respect to a horizontal direction.

13. The display device of claim 12, wherein the electric component plate has a stand fastening part to which a fastening member passing through the fastening hole is fastened.

14. The display device of claim 12, wherein the stand further comprises a deco cover covering the fixing bar from a rear side.

15. The display device of claim 14, wherein the fixing bar and the deco cover are coupled by magnetic force.

16. A display device comprising:
 a display panel;
 a module cover configured to cover the display panel from a rear side;
 a glass cover including a cover part located at a rear of the module cover and a deco part disposed under the cover part and configured not to overlap the display panel and the module cover in a front-rear direction;
 an electric component plate provided at a rear surface of the cover part;
 a back cover configured to cover the electric component plate from a rear side; and
 a stand fixed to the back cover and located at a rear of the glass cover,
 wherein the cover part has a long hole in which a light source facing downward is disposed, and
 wherein an inner circumference of the long hole comprises:
 a light blocking area in which a black layer is formed; and
 a light passing region located under the light source.

* * * * *